United States Patent [19]

Hyldon et al.

[11] Patent Number: 4,840,806
[45] Date of Patent: Jun. 20, 1989

[54] STORAGE STABLE TOMATO - BASED SAUCE

[75] Inventors: Roy Hyldon, Bloomington; Usha Bhatia, St. Paul, both of Minn.

[73] Assignee: The Pillsbury Company, Minneapolis, Minn.

[21] Appl. No.: 201,302

[22] Filed: May 27, 1988

Related U.S. Application Data

[63] Continuation of Ser. No. 36,632, Apr. 10, 1987, abandoned.

[51] Int. Cl.$^4$ .......................... A23L 1/272; A23L 1/39
[52] U.S. Cl. ..................... 426/270; 426/333; 426/330.5; 426/330; 426/589; 426/524
[58] Field of Search ............ 426/589, 270, 333, 330.5, 426/330, 524

[56] References Cited

U.S. PATENT DOCUMENTS

| | | | |
|---|---|---|---|
| 2,924,521 | 2/1960 | Hewitt et al. | 426/49 |
| 3,432,305 | 3/1969 | Kuhr | 426/589 |
| 3,676,154 | 7/1972 | Glasser | 426/589 |
| 3,736,148 | 5/1973 | Katz | 426/330 |
| 3,859,449 | 1/1975 | Rubio | 426/151 |
| 4,087,560 | 5/1978 | Yao | 426/589 |
| 4,145,451 | 3/1979 | Oles | 426/321 |
| 4,191,783 | 3/1980 | Burkwall et al. | 426/335 |
| 4,241,095 | 12/1980 | Shibata et al. | 426/335 |
| 4,276,311 | 6/1981 | Burrows et al. | 426/53 |
| 4,352,832 | 10/1982 | Wood et al. | 426/589 |
| 4,416,904 | 11/1983 | Shannon | 426/19 |
| 4,476,112 | 10/1984 | Aversano | 426/127 |
| 4,477,478 | 10/1984 | Tiberio et al. | 426/330.6 |
| 4,490,400 | 12/1984 | Duncan | 426/589 |
| 4,547,375 | 10/1985 | Mersfelder et al. | 426/589 |
| 4,560,564 | 12/1985 | Bruno et al. | 426/589 |
| 4,564,527 | 1/1986 | Bucsko et al. | 426/335 |
| 4,612,203 | 9/1986 | Wong et al. | 426/802 |
| 4,659,576 | 4/1987 | Dahle et al. | 426/324 |

*Primary Examiner*—Jeanette Hunter
*Attorney, Agent, or Firm*—Robert J. Lewis

[57] ABSTRACT

The present invention relates to a tomato-based sauce which is stable during frozen storage. By reducing the initial pH of the sauce to 4.2 or less and buffering the sauce and freezing, oxidative failure of the sauce can be substantially reduced. The prevention of oxidative failure reduces both color change and flavor change of the sauce with time.

15 Claims, 2 Drawing Sheets

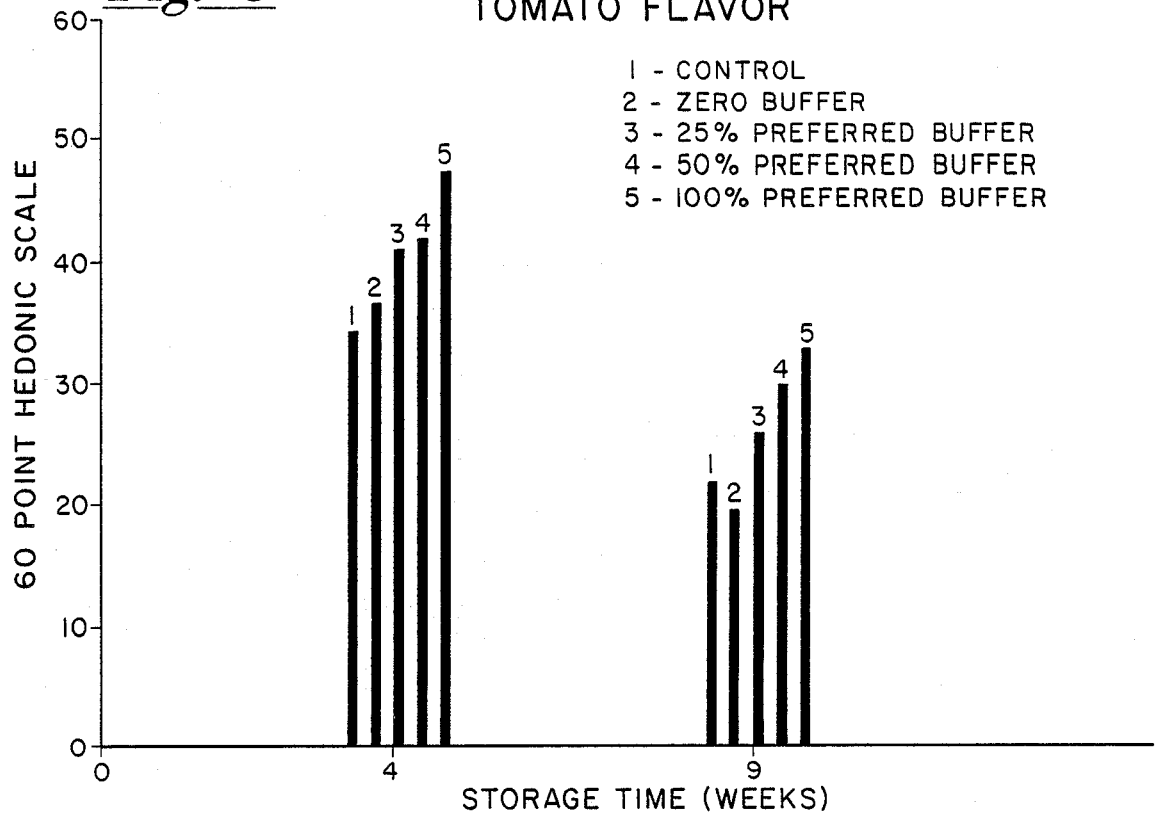
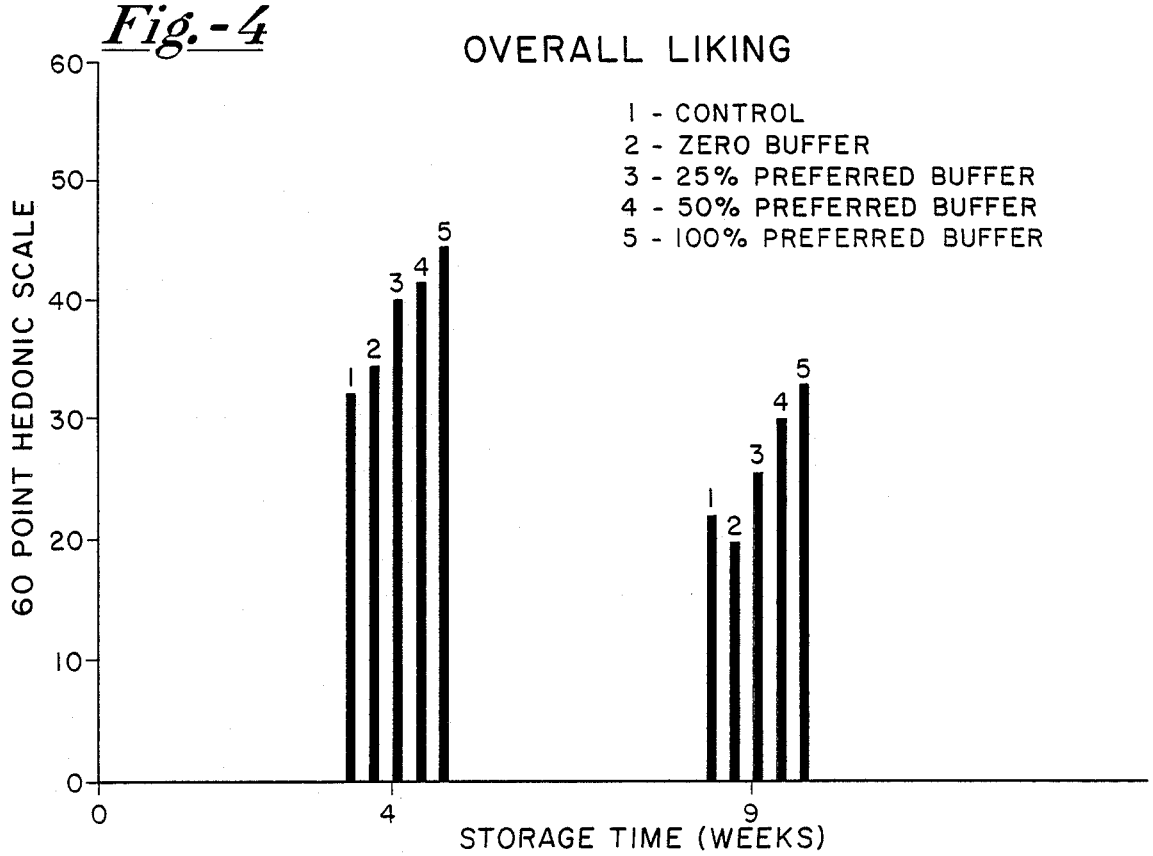

STORAGE STABLE TOMATO - BASED SAUCE

This application is a continuation of application Ser. No. 036,632, filed Apr. 10, 1987.

BACKGROUND OF THE INVENTION

The present invention relates to the prevention of failure of tomato-based sauces during storage, e.g., frozen storage. During storage of tomato-based sauces, they tend to change color from red to orange, develop off-flavors and lose flavor strength even when the food product is in frozen distribution. This was particularly noted when the tomato-based sauce was in contact with cheese, for example, when the sauce is on a pizza.

Although not wishing to be bound by the following theory, the following explanation is provided. It is believed that the major failure mechanism of tomato-based sauces is due to an oxidation reaction in the sauce which occurs even in frozen distribution because of the depressed freezing point of the sauce. For pizza sauce, the sauce contains a high level of tomato paste. Characteristic color and flavor of the tomato product is due to the presence of lipid soluble pigments called lycopenes, a type of beta carotenoid pigment. These pigments are very sensitive to oxidation. In the presence of oxygen, the pigments oxidize resulting in loss of color, flavor and development of off-flavors. The pigment molecule has several double-bonds and when oxygen is present, it combines with the double-bonds resulting in the product having oxidative decomposition which decomposition produces hydroperoxides, carbonyl compounds and other volatile and malodorous compounds.

Oxygen can occur in the sauce by being mixed during a mixing process and can also be in the surrounding atmosphere inside a package. If the tomato-based sauce is canned where all the dissolved oxygen is removed and the container is impervious to oxygen, then the oxidative failure does not occur even after a shelf life of several years.

When tomato sauce is used on other products, for example, frozen pizza, there is essentially no protection of the product from oxygen at any time during its processing and storage, thus providing an opportunity for sauce failure.

For example, when pizza sauce is made, a mixture of tomato paste, water, spices, sugar, salt, oil and thickeners is mixed at high shear and cold temperatures. During mixing, atmospheric oxygen is dissolved in the sauce. After the sauce has been applied to the pizza crust, and other topping ingredients added, the pizza is frozen and packaged. The packaging consists of the plastic film overwrap and a carton. Both of these packaging components offer physical protection but provide little barrier to atmospheric oxygen during product distribution and storage. To eliminate dissolved oxygen during sauce mixing and application to the crust would require high-cost, sophisticated equipment. Further, to provide an effective oxygen barrier package would require high-cost packaging equipment and materials.

Consumer testing indicates that the major problem with frozen pizzas is degradation of sauce with age. It has been a long-felt need in the pizza industry to provide a stable tomato sauce which does not degrade with age to prevent the above discussed problems. The present invention satisfies that need by providing a more stable sauce without the necessity of expensive packaging and/or equipment.

It is an object of the present invention to provide a tomato sauce which is stable during distribution and storage of the sauce product.

It is another object of the present invention to provide a tomato-based sauce which is resistant to failure with time and is inexpensive and safe.

It is a still further object of the present invention to provide a tomato-based sauce which is stable when in contact with other food products, for example, cheese.

FIG. 3 is a bar graph showing tomato flavor rating as a function of storage time for five sauces. This figure also shows the effect of buffer level changes.

FIG. 4 is a bar graph showing overall liking as a function of storage time for five sauces. This figure also shows the effect of buffer level changes.

DETAILED DESCRIPTION

Figure 1:
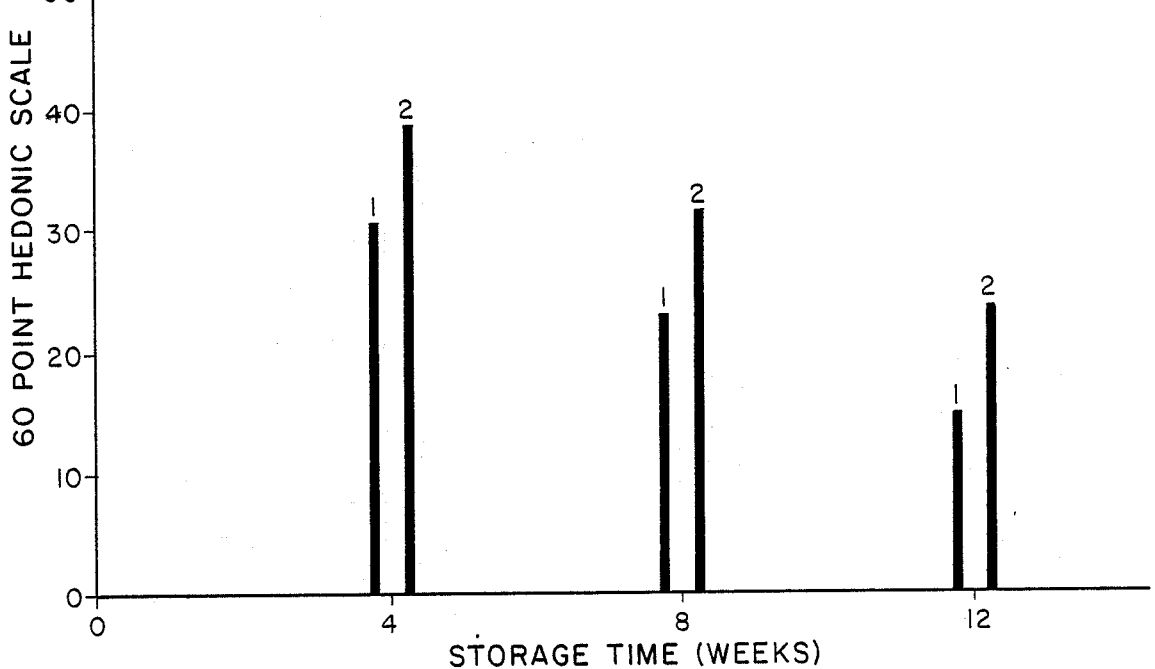
FIG. 1 is a bar graph showing tomato flavor rating as a function of storage time for two tomato sauces.

Tomato-based sauce as used herein means a sauce which contains above about 6% tomato solids on a dry basis by weight of sauce, water of less than about 90% by weight of sauce and acid. The normally occurring acid in tomato sauce is citric acid with a typical tomato sauce having a pH in the range of between about 4.3 and 5.5. Tomato-based sauce can have a wide range of ingredients to provide a product suitable for an extended use. For example, the tomato-based sauce may be in the form of a very thick paste or in the form of a very thin and watery sauce. Also, the sauces can contain other ingredients including oil, spices, etc.

The tomato-based sauce contains tomato solids on a dry basis in the range of about 6% to about 30% by weight of sauce, preferably in the range of between about 7% to about 25% and more preferably in the range of between about 8% to about 20% by weight of sauce. Water (total) can be present in the range of between about 30% to about 90%, preferably in the range of between about 35% to 85% and more preferably in the range of between about 40% to 80% by weight of sauce. Tomato sauce naturally contains citric acid, but other edible acids can also be added as hereinafter described to adjust the pH of the sauce. Other edible acids include malic, latic, acetic and gluconic. Oil can also be added to the sauce. Preferably soy bean oil can be used and the oil should be present in the range of between about 0.5% and about 15%, preferably in the range of between about 2% and about 12% and most preferably in the range of between about 3% and about 9% by weight of sauce. Spices, flavors and other minors ingredients, for example, sugar, salt, pepper, garlic, onion powder, etc. can also be added with their amounts depending upon the desired end result as is known in the art.

The pH of the tomato-based sauce is less than about 4.2, preferably less than about 4.1 and more preferably in the range of between about 4.1 and about 3.8. This pH is lower than typical tomato sauce pH which is about 4.3 or higher. The pH of the sauce can be adjusted by adding an edible acid as described above. The amount of acid needed is determined by the desired pH.

As described above, it is believed that the major failure mechanism of such sauces during storage is due to oxidation reaction of some of the components of the sauce. It was found that the sauce pH/acidity has a major effect on the rate of oxidative reaction, thus causing, with time, loss of color, loss of flavor and off-flavors. A change of one-half pH unit or less can significantly affect flavor retention or loss. It was found that oxidation of the tomato sauce can be controlled through sauce pH control.

It is also desired to buffer the tomato sauce to help maintain the above pH values throughout time. The amount of buffer will be dependent on the desired increase in shelf life. The greater the desired increase, the more buffer needed. This is particularly important when cheese is in contact with the tomato sauce. The buffer stabilizes the pH at a desired level as described above. The buffer can be any suitable buffer system and is made of a weak edible acid and its salt. Various buffer systems have been utilized, some of which include citric acid and sodium citrate, gluconic acid/sodium glucanate, acetic acid/sodium acetate malic acid/sodium malate. The desired buffer system is normally determined by the flavor or taste of the particular buffer in the particular food product.

As discussed, buffer is added to the sauce to prevent a pH change to an unacceptable level during shelf life of the food product. Buffer is particularly needed for longer shelf life products and/or for products that have components which can enhance a pH change, for example, cheese. Cheese can quickly cause a pH change, as discussed below. Thus, as is known how in the art, sufficient buffer is added to maintain the sauce pH below a desired value. The amount of buffer will be determined by initial sauce pH, expected shelf life, storage conditions, e.g. temperature, and the food components adjacent the sauce.

One preferred buffer system is composed of 1 Molar acetic acid (60 gram vinegar) and 1 Molar sodium acetate in the ratio of 25:6, which yields a buffer of pH 4.0. The sauce can contain such buffer solution in an amount of at least about 0.5%, preferably at least about 1.25% and most preferably at least about 2.5%.

When cheese is used adjacent the tomato sauce or is in contact therewith, a large difference exists between cheese pH and sauce pH. Cheese pH is normally in the range of between about 5.4 and 6.2. Unbuffered sauce pH is between 4 and 6 in typical food systems. When cheese is present in the product, a significant shift in sauce pH can occur during processing. In addition, the change in pH continues during storage. The pH of the cheese decreases and the pH of the sauce increases due to the high buffering capacity of cheese that neutralizes acid from the sauce and as a result the sauce becomes less acidic causing increased oxidation. When no cheese is present in the product, only a minor shift in sauce pH occurs, but the tomato sauce will still lose red color and flavor and develop off-flavors.

Approaches that could be used to prevent the cheese/sauce interaction would be to minimize the pH differential between the two products, but suitable high acid cheeses are not currently available. Also, contact between the cheese and the sauce could be reduced or eliminated by barriers. However, it was found that the buffering system as described above provides adequate results. But, if the tomato sauce is high in solids and low in moisture it offers an optimum condition for oxidation due to the high mobility of the sauce at even frozen or freezer temperatures.

As discussed above, the tomato sauce is buffered with the buffering system being dependent on the adjacent food product. When cheese is not present or if the sauce is low $A_w$ (below about 0.84), a preferred buffering system is citric acid and when cheese is present and if the sauce is high $A_w$ (above about 0.92), it is preferred that the acid added to the tomato sauce be non-chelating. Such a system would be malic acid added to the sauce and the buffering being sodium acetate and acetic acid.

The amount of buffering can be determined empirically with the amount being dependent on surface area of cheese in contact with the sauce and the desired increase in shelf life as discussed above. When cheese is not present, any edible acid, depending on its taste, can be used.

It is preferred that the oil added to the low $A_w$ tomato sauce be a high-stability oil having 30 to 60 hours stability to reduce the sauce oxidation and off-flavor development. Oil or fat stability can be measured in accordance with A.O.C.S. method Cd 12-57 revised 1981. The stability hours measures the time (in hours) required for a fat sample to attain a certain peroxide value (100MEQ/KG) when subjected to the specific conditions. The peroxide value indicates oxidative changes in the fat. A preferred oil is soy oil. During mixing, oxygen is incorporated into the sauce providing double-bonds. These double-bonds react with active sites in the fat molecules starting a chain reaction giving progressive degradation of the fat molecules. The products of this attack by oxygen include hydroperoxide aldehydes, ketones and short-chain fatty acids which have objectionable flavors and aromas that are detectable at very low concentrations. The composition of the fat affects the rate of oxidative failure. A high stability oil has fewer unsaturated fatty acids and fewer double-bonds, thereby providing fewer sites for oxidation.

In addition to the above, antioxidants can also be added to the low $A_w$ sauce to reduce oxidation. TBHQ (Di-T Butyl Hydroquinone) was found effective as an oil-soluble, antioxidant. Other oil-soluble, antioxidants, BHA and BHT, can also be used. Also, ascorbic acid is an effective water-soluble, antioxidant. The addition of such antioxidants should be in the range of between about 0.002% and about 0.02% by weight of sauce.

The following examples illustrate the effectiveness of the present invention.

EXAMPLE 1

High $A_w$ Sauce

Figure 2:
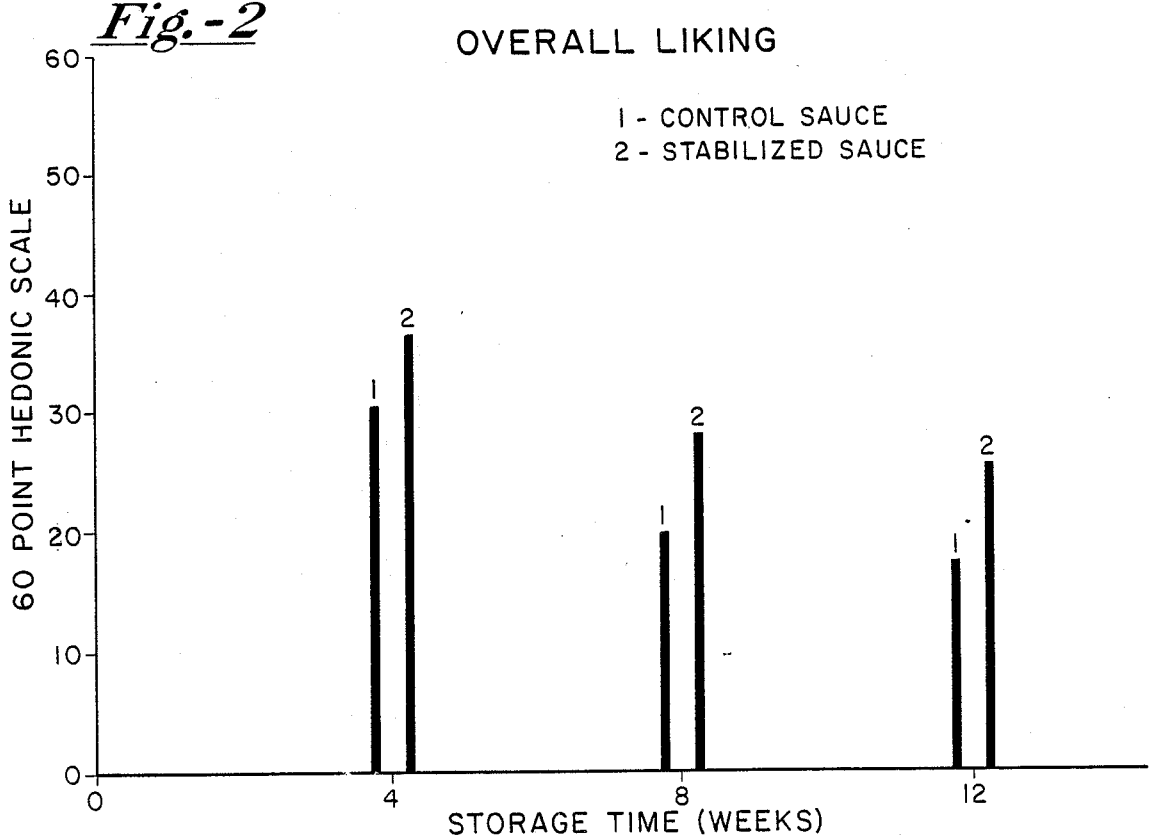
FIG. 2 is a bar graph showing overall liking as a function of storage time for two tomato sauces.

Two sauces, with the below formulas, were prepared. The control sauce represents a typical pizza sauce and the stabilize sauce is that which was made in accordance with the present invention. Pizza crusts were topped with each of the sauces and shredded cheese and were then frozen and put into a control temperature storage of $-12.2°$ C. for accelerated shelf life testing. Examples of the pizzas were taken from storage at 4, 8 and 12-week intervals. The pizzas were reheated and evaluated by a seven-member expert panel. The responses were recorded on a 60-point hedonic scale as shown in FIGS. 1 and 2 for overall liking and tomato flavor. It can be seen that at each of the times of testing, the stabilized sauce provided a significantly higher quality rating for each of the two attributes.

| Control Pizza Sauce Formula | |
|---|---|
| | Percentage |
| Tomato paste (31% NTSS) (Natural Tomato Soluble Solids) | 31.18% |
| Water | 58.25 |

-continued

| Control Pizza Sauce Formula | |
|---|---|
| | Percentage |
| Soybean oil | 3.00 |
| Spice blend | 7.20 |
| Red color solution | 0.37 |
| pH of sauce = 4.35 | 100.00% |

| Stabilized Pizza Sauce | |
|---|---|
| | Percentage |
| Tomato paste (31% NTSS) | 31.18% |
| Water | 52.11 |
| Soybean oil | 3.00 |
| Spice blend (as for control) | 7.20 |
| Sugar | 1.60 |
| Salt | 0.14 |
| Red color solution | 0.37 |
| Malic acid (1M solution) | 1.90 |
| 4.0 pH buffer solution | 2.50 |
| (acetic acid/sodium acetate) | |
| pH of sauce = 4.00 | 100.00% |

EXAMPLE 2

High $A_w$ Sauce

Five batches of pizza sauce were prepared. A control sauce with no added acid or buffering solution and four other sauces with malic acid added to adjust the sauce pH to 4.0 from 4.35. Each of these four sauces had a different level of buffering solution. Pizza crusts were topped with each of the sauces and shredded after which the pizzas were frozen and put into controlled temperature storage at −12.2° C. for accelerated shelf life testing. Samples of the pizzas were taken from storage at 4 and 9 weeks and evaluated. The pizzas were reheated and evaluated by a seven-member expert panel with the evaluations being recorded on a 60-point hedonic scale. FIGS. 3 and 4 show the effect of the amount of buffering and the effect of a lower pH. It can be seen that, in general, the higher the level of buffering, the use of a lower pH provided higher quality rating on both tomato flavor and overall liking. With regard to the 9-week storage test on the overall liking rating, 0% buffer and the 25% buffer solution indicates that there was a slight decline in quality with an increase in buffer. However, it is to be noted that these differences between Column 1 and 2 are not statistically different.

The following are the formulas for each of the above described sauces:

| Column-Aided Formula Charts | | | | | |
|---|---|---|---|---|---|
| | | BUFFER PERCENT LEVEL | | | |
| | Control | 100% | 50% | 25% | 0% |
| Tomato paste (31% NTSS) | 31.18% | 31.18% | 31.18% | 31.18% | 31.18% |
| Water | 58.25 | 52.11 | 53.50 | 52.225 | 55.10 |
| Soybean oil | 3.00 | 3.00 | 3.00 | 3.00 | 3.00 |
| Spice blend | 7.20 | 7.20 | 7.20 | 7.20 | 7.20 |
| Sugar | 0.00 | 1.60 | 1.60 | 1.50 | 1.25 |
| Salt | 0.00 | 0.14 | 0.00 | 0.00 | 0.00 |
| Red color solution | 0.37 | 0.37 | 0.37 | 0.37 | 0.37 |
| Malic acid (1M solution) | 0.00 | 1.90 | 1.90 | 1.90 | 1.90 |
| 4.0 pH buffer solution | 0.00 | 2.50 | 1.25 | 0.625 | 0.00 |
| (acetic acid/sodium acetate) | | | | | |
| | 100.00% | 100.00% | 100.00% | 100.00% | 100.00% |

From the foregoing, it can be seen that the shelf life of tomato sauce can be significantly increased in a simple and effective manner.

What is claimed and desired to be secured by Letters Patent is:

1. A method of preventing loss of color and flavor of a tomato-based sauce said method comprising:
    (a) forming a sauce having tomato solids, on a dry basis, in an amount in excess of about 6% by weight of sauce, total water in an amount in excess of about 30% by weight of sauce and edible acid in an amount sufficient to provide a sauce pH of about 4.2 or lower.
    (b) after forming said sauce, storing said sauce under frozen storage conditions.
2. A method as set forth in claim 1 including:
    (a) applying the sauce to a food product; and
    (b) placing said food product and sauce in a package, which package provides little barrier for the sauce to atmospheric oxygen.
3. A method as set forth in claim 2 wherein said water is present in the range of between about 30% and about 90% by weight of sauce.
4. A method as set forth in claim 2 wherein said water is present in the range of between about 35% and about 85% by weight of sauce.
5. A method as set forth in claim 2 wherein said water is present in the range of between about 40% and about 80% by weight of sauce.
6. A method as set forth in claim 2, 3, 4 or 5 wherein said pH is about 4.1 or lower.
7. A method as set forth in claim 6 wherein said sauce contains buffer in an amount sufficient to buffer said sauce.
8. A method as set forth in claim 2, 3, 4 or 5 wherein said pH is in the range of between about 3.8 and about 4.1.
9. A method as set forth in claim 8 wherein said sauce contains buffer in an amount sufficient to buffer said sauce.
10. A method as set forth in claim 2 wherein said sauce has an $A_w$ of less than about 0.84.
11. A method as set forth in claim 2 wherein said sauce has an $A_w$ above about 0.92.
12. A method as set forth in claim 2, 3, 4 or 5 wherein said edible acid includes malic acid.
13. A method as set forth in claim 2, 3, 4 or 5 wherein said edible acid includes citric acid.
14. A method as set forth in claim 10 or 11 wherein said pH is about 4.1 or lower.
15. A method as set forth in claim 10 or 11 wherein said pH is in the range of between about 3.8 and about 4.1.

* * * * *